United States Patent
Cunchon et al.

(10) Patent No.: US 7,275,132 B2
(45) Date of Patent: Sep. 25, 2007

(54) COMPUTING MACHINE WITH HARD STOP-TOLERANT DISK FILE MANAGEMENT SYSTEM

(75) Inventors: François Cunchon, Magny les Hameaux (FR); Van-Dung Nguyen, Limeil Brevannes (FR); Michael Planes, La Celle Saint-Cloud (FR)

(73) Assignee: Bull SA, Louveciennes (FR)

( * ) Notice: Subject to any disclaimer, the term of this patent is extended or adjusted under 35 U.S.C. 154(b) by 98 days.

(21) Appl. No.: 09/884,048

(22) Filed: Jun. 20, 2001

(65) Prior Publication Data

US 2001/0054130 A1    Dec. 20, 2001

(30) Foreign Application Priority Data

Jun. 20, 2000  (FR) .................................. 00 07862

(51) Int. Cl.
*G06F 11/22*  (2006.01)

(52) U.S. Cl. .................... 711/112; 711/104; 714/15; 714/23; 714/36

(58) Field of Classification Search ................ 711/170, 711/173, 111, 112, 104, 174; 714/13, 15, 714/23, 36
See application file for complete search history.

(56) References Cited

U.S. PATENT DOCUMENTS

| | | | | |
|---|---|---|---|---|
| 5,128,995 A | * | 7/1992 | Arnold et al. ................. | 713/1 |
| 5,577,220 A | * | 11/1996 | Combs et al. ............... | 711/206 |
| 5,586,301 A | * | 12/1996 | Fisherman et al. ......... | 711/152 |
| 5,708,776 A | | 1/1998 | Kikinis | |
| 6,009,524 A | * | 12/1999 | Olarig et al. ............... | 713/200 |
| 6,199,179 B1 | * | 3/2001 | Kauffman et al. ............ | 714/26 |
| 6,393,559 B1 | * | 5/2002 | Alexander ..................... | 713/2 |
| 6,430,663 B1 | * | 8/2002 | Ding .......................... | 711/162 |
| 6,502,208 B1 | * | 12/2002 | McLaughlin et al. ......... | 714/25 |
| 6,564,326 B2 | * | 5/2003 | Helbig, Sr. .................. | 726/34 |
| 6,591,376 B1 | * | 7/2003 | VanRooven et al. .......... | 714/36 |
| 6,948,099 B1 | * | 9/2005 | Tallam ........................ | 714/38 |

FOREIGN PATENT DOCUMENTS

EP    0 917 060 A    5/1999

OTHER PUBLICATIONS

Cohen FB "A Note on High Integrity PC Bootstrapping" Computers & Security, International Journal Devoted to the Study of Technical and Financial Aspects of Computer Security, NL, Elsevier Science Publishers, Amsterdam. vol. 10, No. 6, Oct. 1, 1991, pp. 535-539, XP000264764, ISSN: 0167-4048, p. 537, left hand col., line 20-right hand column, line 47.

* cited by examiner

*Primary Examiner*—T Nguyen
(74) *Attorney, Agent, or Firm*—Miles & Stockbridge P.C.; Edward J. Kondracki

(57) ABSTRACT

The computing machine (1) comprises a RAM (3) and a mass memory (5) in which an operating system is stored. The mass memory (5) comprises a partition (8) that is read-only accessible to the operating system, said partition (8) containing a startup function, an automatic repair function, and a function for mounting said operating system.

12 Claims, 2 Drawing Sheets

COMPUTING MACHINE WITH HARD STOP-TOLERANT DISK FILE MANAGEMENT SYSTEM

FIELD OF THE INVENTION

The field of the invention is that of computing machines, and more particularly relates to the startup of same.

BACKGROUND OF THE INVENTION

In a known way, a computing machine runs by means of an operating system that manages its resources in order to execute processes. The operating system generally resides in a mass memory of the machine. The mass memory is a permanent memory such as a hard disk.

When the machine starts up, its firmware initiates a startup function resident at a given address of the mass memory. The startup function activates the operating system, which builds itself data structures from information resident in the mass memory. The data structures are used, for example, to allocate and manage storage areas made available to processes to be executed. While the machine is running, the operating system adapts these data structures to changes in the processes being executed. In order not to overload the RAM and in order to be able to retrieve these data structures after a shutdown of the machine, the operating system regularly saves the data structures in the mass memory.

If the machine is shut down in accordance with pre-established rules, the operating system puts the data structures in a coherent state and saves them in the mass memory. Thus, the machine is shut down in a coherent, safeguarded state, which allows it to restart in a state that keeps track of the processes executed before it was shut down.

If the machine is shut down without following the pre-established rules, for example in case of a hard restart or an untimely shutoff, the data structures may not be able to be saved in a coherent state, since the operating system may, for example, have written them into the mass memory only partially. During a restart of the machine, the mounting function of the operating system then detects incoherencies and generates an error signal. Using an operator interface, it is then necessary for a human operator to intervene in order to fix or at least acknowledge the error. This can be tedious, and moreover, requires the presence of a human operator and the existence of an operator interface.

SUMMARY OF THE INVENTION

To eliminate the aforementioned drawbacks, one subject of the invention is a computing machine comprising a RAM and a mass memory in which an operating system is stored. The computing machine is characterized in that the mass memory comprises a partition that is read-only accessible to the operating system, said partition containing a startup function, an automatic repair function, and a function for mounting said operating system.

The partition being read-only accessible to the operating system, the latter cannot corrupt its contents when the machine is running. Thus, no matter what the conditions under which the operation of the machine is interrupted, it is capable of restarting in a minimal configuration with the content of the read-only partition. The automatic repair function, itself resident in this partition, makes it possible to acknowledge any error detected during the mounting of the operating system without requiring any human intervention.

BRIEF DESCRIPTION OF THE DRAWINGS

Other details and advantages of the invention emerge from the following description in reference to the figures, in which.

DESCRIPTION OF THE PREFERRED EMBODIMENTS

Figure 1:
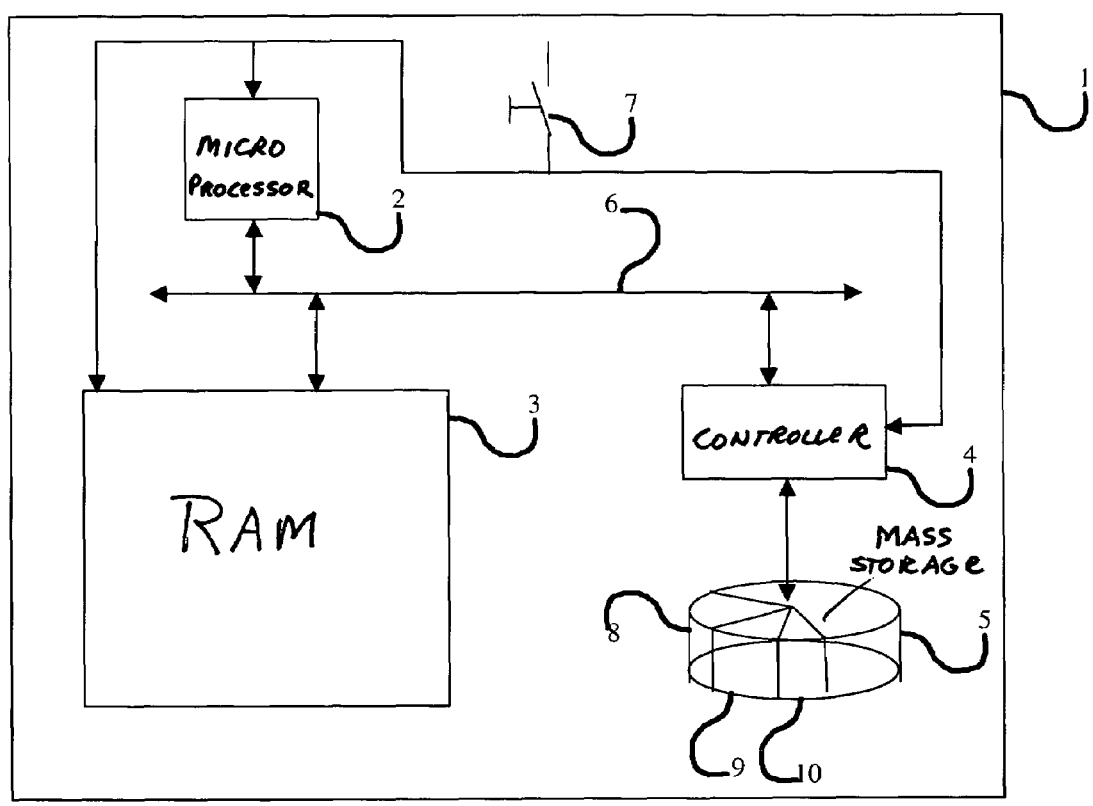
FIG. 1 presents a machine according to the invention.

Referring to FIG. 1, a machine 1 comprises a microprocessor 2, a RAM 3, a mass memory 5, and a bus 6 that allows the microprocessor 2 to access the RAM 3 and the mass storage 5 by means of a controller 4. A push button 7 makes it possible to restart each of the elements 2, 3, 4 of the machine.

The mass memory 5 is preferably a magnetic disk that allows data to remain saved in a state that preceded a shutdown or a restart of the machine.

The mass memory 5 contains the code and data of an operating system for managing the operation of the machine 1. The mass memory 5 also contains the code and data of applicative functions executed by the machine 1.

The mass memory 5 comprises several partitions 8, 9, 10. The partition 8 is read-only accessible to the operating system. This means that the code and the data stored in the partition 8 cannot be modified when the machine 1 is running.

The partition 8 contains the code of a startup function and a function for mounting the operating system. The startup function, during the initialization of the machine 1, serves to activate the operating system. The mounting function, during the bootup of the operating system 1, serves to construct an execution environment for the operating system. The partition 8 also contains the code of a standard error acknowledgement function and an automatic repair function, explained in the description below.

The code of the startup function contains a first instruction sequence that loads the contents of the partition 8 into RAM 3 and a second instruction sequence that calls the automatic repair function, which is then loaded into RAM.

The code of the automatic repair function contains a third instruction sequence that calls the mounting function, which is then loaded into RAM, a fourth instruction sequence that systematically calls the standard acknowledgement function when the mounting function signals an error, and a fifth code sequence that calls the startup function at the return of the standard acknowledgement function.

In way that is known in UNIX type operating systems such as for example LINUX, the mounting function uses and builds data structures such as file management tables. While the machine is running, the operating system makes these data structures dynamic by adapting them to the processes executed by the machine. These data structures are normally saved in mass memory so that they can be reused when the machine is restarted after a shutdown or an initialization that leaves these data structures in a coherent state. After an untimely shutoff, or more generally an untimely restart, these data structures may be incoherent. When the mounting function builds the data structures based on data structures saved in the mass memory, the mounting function indicates an error if it detects an incoherency. Normally, the error indicated is communicated by a message on a screen of the machine in order to allow a human operator to fix the error as best he can, if he has the information required to do so.

In an alternate solution, the mounting function offers the human operator the choice of calling the standard acknowledgement function.

The standard acknowledgement function tries to repair an indicated error using the only data available to it in the mass memory. If this data is insufficient, the standard function acknowledges the error anyway, thus losing the benefit of the data structures for which the error was detected.

If there are no errors, the mounting function continues the activation of the operating system in the part (9).

The advantage of the automatic repair function is that it avoids the need for a human operator to intervene. Instead of sending a message on the screen, the automatic repair function systematically calls the standard acknowledgement function when the mounting function indicates an error.

The partition 8, which is not write-accessible to the operating system, contains the data required to start the machine in a minimal configuration. The partition 9, which is readwrite accessible, contains the data structures updated by the operating system during the normal running of the machine.

By calling the startup function at the return of the standard acknowledgement function, the next call of the mounting function in the next cycle will no longer detect the error acknowledged in this call cycle. If necessary, after several cycles of calling the startup function, calling the mounting function, and triggering the automatic repair function, the mounting function no longer detects any errors and continues the activation of the operating system.

Thus, the machine can restart, at least in a minimal configuration, by means of the data structures of the partition 8 and the data structures of the partition 9, for which no incoherency has been detected, or for which an incoherency has been able to be fixed by the standard acknowledgement function without the intervention of a human operator.

Other partitions like the partition 10 contain the code and data of applicative functions that are executable by means of the operating system.

Figure 2:
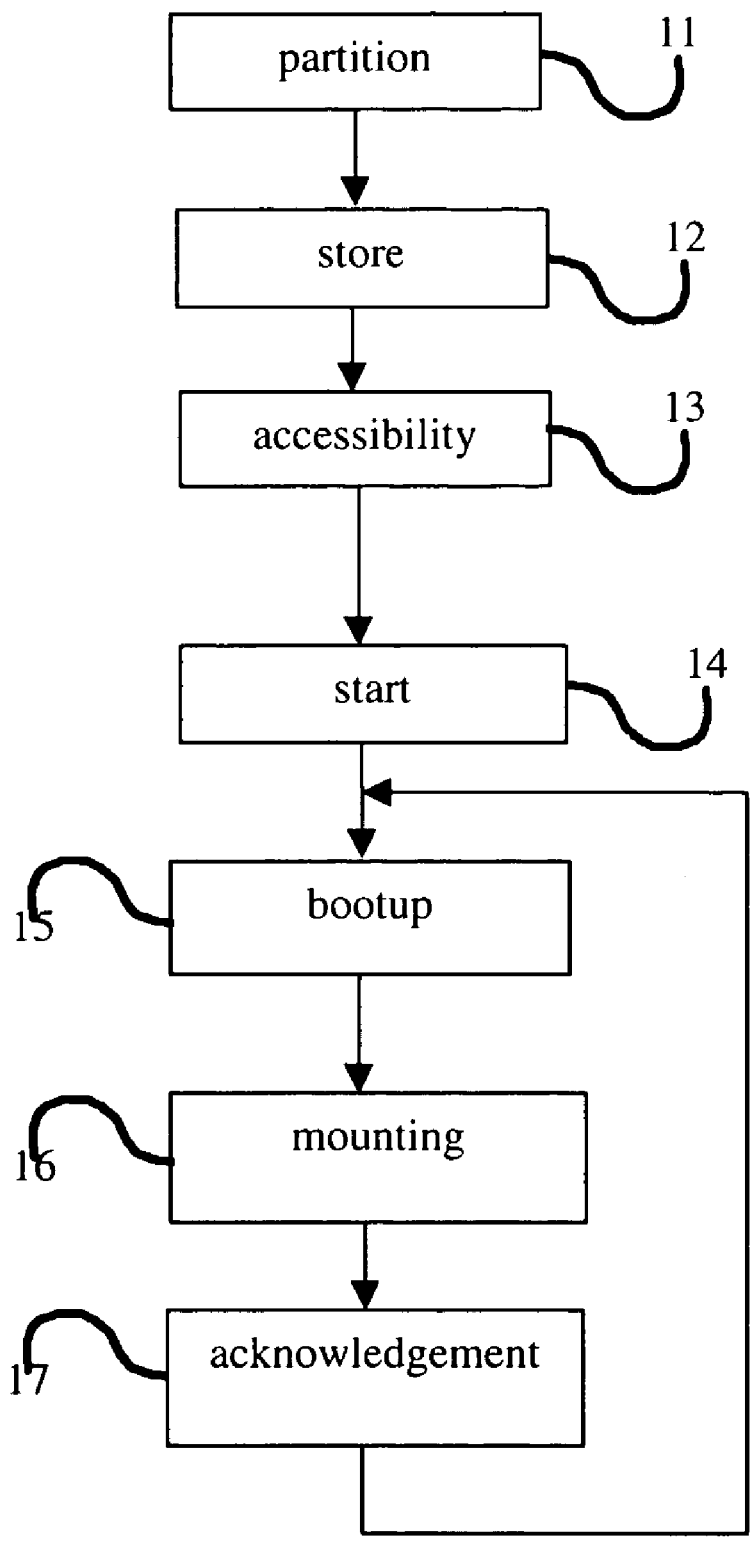
FIG. 2 presents a method according to the invention.

Referring to FIG. 2, a method according to the invention comprises a step 11 that creates at least one partition 8 in the mass memory. A step 12 stores, in the partition 8, the code and data of a startup function, the code and data of one or more minimal functions for activating an operating system, such as for example the mounting function "mount" and the standard acknowledgement function "fsck" of the LINUX operating system, as well as the automatic repair function.

A step 13 declares the partition 8 read-only accessible to the operating system to be activated.

Steps 11 through 13 are preferably performed in the factory on a disk which, when installed in the machine 1, constitutes its mass memory. The subsequent steps are implemented in the machine 1 itself.

A step 14 is triggered by starting or initializing the machine 1 by means of the push button 7. Step 14 resets all of the elements of the machine 1, such as the RAM 3 and the controller 4. Step 14 starts the microprocessor 2 by means of a piece of firmware known as a BIOS, which finishes by branching the microprocessor 2 to the startup function, which resides at a specific address of the partition 8.

A step 15 activates the startup function, which loads the contents of the partition 8 into RAM so that it is read-write accessible by the operating system to be activated.

A step 16 activates in RAM 3 the automatic repair function that calls the mounting function. If no error is detected by the mounting function, the bootup of the operating system of the machine continues with the reading and writing of other partitions of the disk 5, so as to automatically start, in a known way, applicative functions that are executable by means of the operating system.

A step 17 is triggered by an error signal detected by the mounting function. The automatic repair function then calls the standard acknowledgement function, at the return of which step 15 is triggered again.

The invention is particularly advantageous when the machine 1 has no screen or keyboard. This is the case with an embedded system, in which the push button 7 may be replaced by a remote control. This is also the case with a black box, which it is undesirable for a human operator to be able to enter. There are existing black boxes of this type, with a permanent memory into which an executable code is written, complete with its functionalities. The advantage of the presence of a disk according to the invention with an operating system is that it gives the black box the advantages of a computer in terms of computing power and adaptability to multiple and scalable applications.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A computing machine comprising:

a RAM and a mass memory;

an operating system stored in the mass memory, the mass memory including a partition, said partition being read-only accessible to the operating system, and said partition containing a startup function and an automatic repair function, wherein for every startup of the computing machine, a BIOS initiates the startup function which resides at an address of the partition, the startup function which activates the operating system calls the automatic repair function, the automatic repair function calls an operating system mounting function which constructs an execution environment for the operating system based on operating system data structures saved in the mass memory and, if an error based on incoherent operating system data structures saved in the mass memory before the commencement of the operating system mounting function is detected during the operating system mounting function, the automatic repair function automatically calls the startup function upon return of a standard acknowledgement function.

2. A computing machine according to claim 1, wherein said startup function comprises a first code sequence that loads contents of the partition into the RAM and a second code sequence that activates said automatic repair function in the RAM.

3. A computing machine according to claim 2, wherein said automatic repair function comprises a third code sequence that calls said operating system mounting function, the mounting function executable in RAM with write capability in at least one other partition of the mass memory.

4. A computing machine according to claim 3, wherein said automatic repair function comprises a fourth code sequence that acknowledges an error indicated by said operating system mounting function and a fifth code sequence that restarts the computing machine after an acknowledgement of the error.

5. A computing machine according to claim 4, wherein said partition contains the standard acknowledgement function and in that the fourth code sequence calls said standard acknowledgement function executable in RAM with write capability in at least one other partition of the mass memory.

6. A computing machine according to claim 1, wherein the mass memory is a hard disk.

7. A computing machine according to claim 1, further including a switch for resetting the RAM and restarting the machine.

8. The computing machine of claim 1, wherein the automatic repair function acknowledges one or more errors detected during the mounting of the operating system.

9. The computing machine of claim 1, wherein the automatic repair function calls the standard acknowledgement function that attempts to repair the error utilizing only data in the mass memory.

10. The computing machine of claim 1, wherein the automatic repair function comprises:
   an instruction sequence that is capable of calling the operating system mounting function;
   an instruction sequence that is capable of calling the standard acknowledgement function; and
   an instruction sequence that is capable of calling the startup function upon return of the standard acknowledgement function.

11. A method for automatically starting a computing machine having a RAM and a mass memory having a partition, the mass memory having an operating system stored therein, comprising:
   starting operation of the machine by means of a signal;
   loading into the RAM contents of the partition of the mass memory;
   mounting an operating system from the RAM that includes an automatic repair function, the mounting of the operating system based on a call from the automatic repair function which is called by a startup function residing in the partition, the startup function being operable to activate the operating system, wherein said mounting the operating system comprises constructing an execution environment for the operating system based on operating system data structures saved in the mass memory;
   acknowledging any error indicated in mounting the operating system based on incoherent operating system data structures saved in the mass memory before the commencement of the operating system mounting function; and
   reactivating, in response to said acknowledging, the loading of the contents of the partition of the mass memory.

12. A method according to claim 11, further comprising:
   creating a plurality of partitions in the mass memory; and
   storing at least part of the operating system and functions for executing a startup, the automatic repair function that is capable of calling a mounting function and an acknowledgment function in one of said plurality of partitions,
   wherein said partition is read-only accessible to said operating system.

* * * * *